United States Patent
Zheng et al.

(10) Patent No.: US 10,516,923 B2
(45) Date of Patent: Dec. 24, 2019

(54) DYNAMIC BANDWIDTH ASSIGNMENT METHOD AND APPARATUS, AND PASSIVE OPTICAL NETWORK SYSTEM

(71) Applicant: Huawei Technologies Co., Ltd., Shenzhen, Guangdong (CN)

(72) Inventors: Gang Zheng, Shenzhen (CN); Xifeng Wan, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/020,888

(22) Filed: Jun. 27, 2018

(65) Prior Publication Data
US 2018/0316992 A1 Nov. 1, 2018

Related U.S. Application Data

(63) Continuation of application No. PCT/CN2015/100204, filed on Dec. 31, 2015.

(51) Int. Cl.
*H04Q 11/00* (2006.01)
*H04B 10/25* (2013.01)

(52) U.S. Cl.
CPC ......... *H04Q 11/0067* (2013.01); *H04B 10/25* (2013.01); *H04Q 11/0005* (2013.01);
(Continued)

(58) Field of Classification Search
CPC ........... H04Q 11/0067; H04Q 11/0066; H04Q 11/0005; H04Q 2011/0088; H04Q 2011/0016; H04B 10/25
See application file for complete search history.

(56) References Cited

U.S. PATENT DOCUMENTS

2004/0252714 A1 12/2004 Oh et al.
2006/0153564 A1* 7/2006 Ryu ..................... H04B 10/27
                                                         398/69
(Continued)

FOREIGN PATENT DOCUMENTS

| CN | 1574709 A | 2/2005 |
|---|---|---|
| CN | 101252789 A | 8/2008 |
| CN | 102014319 A | 4/2011 |

OTHER PUBLICATIONS

Matthew Mathis et al, "The Macroscopic Behavior of the TCP Congestion Avoidance Algorithm," Computer Communication Review, a publication of ACM SIGCOMM, vol. 27,No. 3, Jul. 1997, 16 pages.

(Continued)

*Primary Examiner* — Afshawn M Towfighi
(74) *Attorney, Agent, or Firm* — Womble Bond Dickinson (US) LLP

(57) ABSTRACT

A bandwidth assignment method and apparatus, and an optical network system are disclosed. The method includes: setting a maximum bandwidth grant size and a maximum burst bandwidth grant size for an optical network unit; receiving a bandwidth assignment request of the optical network unit; and when an optical line terminal determines, according to the bandwidth assignment request, that a bandwidth grant size requested to be assigned in the bandwidth request is greater than the set maximum bandwidth grant size and less than or equal to the set maximum burst bandwidth grant size, determining, by the optical line terminal, in response to the request, to assign the requested bandwidth grant size to the optical network unit. Therefore, timely and accurate transmission of massive uplink burst data traffic is ensured, a transmission delay is reduced, (Continued)

service performance is improved, and system bandwidth utilization is greatly increased.

15 Claims, 3 Drawing Sheets

(52) U.S. Cl.
CPC . *H04Q 11/0066* (2013.01); *H04Q 2011/0016* (2013.01); *H04Q 2011/0088* (2013.01)

(56) References Cited

U.S. PATENT DOCUMENTS

| | | | |
|---|---|---|---|
| 2010/0215369 A1 | 8/2010 | Effenberger et al. | |
| 2010/0254407 A1* | 10/2010 | Tanaka | H04J 3/1694 370/468 |
| 2012/0213518 A1* | 8/2012 | Tamai | H04J 14/0247 398/58 |
| 2014/0099113 A1 | 4/2014 | Fang et al. | |

OTHER PUBLICATIONS

Simone Basso et al, "Estimating Packet Loss Rate in the Access Through Application-Level Measurements," W-MUST'12, Aug. 17, 2012, Helsinki, Finland, 6 pages.

ITU-T G.988 Amendment 1 (May 2014), Series G: Transmission Systems and Media, Digital Systems and Networks, Digital sections and digital line system—Optical line systems for local and access networks, ONU management and control interface (OMCI) specification, Amendment 1: Maintenance. May 2014, 63 pages.

ITU-T G.984.3 (Jan. 2014), Series G: Transmission Systems and Media, Digital Systems and Networks, Digital sections and digital line system—Optical line systems for local and access networks, Gigabit-capable passive optical networks (G-PON): Transmission convergence layer specification, Jan. 2014, 170 pages.

ITU-T G.987.3 (Jan. 2014), Series G: Transmission Systems and Media, Digital Systems and Networks, Digital sections and digital line system—Optical line systems for local and access networks, 10-Gigabit-capable passive optical networks(XG-PON): Transmission convergence (TC) layer specification. Jan. 2014, 146 pages.

* cited by examiner

DYNAMIC BANDWIDTH ASSIGNMENT METHOD AND APPARATUS, AND PASSIVE OPTICAL NETWORK SYSTEM

CROSS-REFERENCE TO RELATED APPLICATION

This application is a continuation of International Patent Application No. PCT/CN2015/100204 filed on Dec. 31, 2015, the disclosure of which is hereby incorporated by reference in its entirety.

TECHNICAL FIELD

The present application relates to passive optical network (PON) technologies, and in particular, to a dynamic bandwidth assignment method and apparatus, and a passive optical network system.

BACKGROUND

An access PON is a passive optical network having a point-to-multipoint (P2MP) structure, and includes an optical line terminal (OLT), an optical distribution network (ODN), and at least one optical network unit (ONU) or optical network terminal (ONT). The ONT may be considered as a special ONU, and therefore the ONU is uniformly used in the following in this document.

In an uplink direction (a direction from an ONU to an OLT), all ONUs share an optical transmission medium in a Time Division Multiple Access (TDMA) manner. In the TDMA manner, the OLT performs a bandwidth grant on an ONU. For the ONU, this bandwidth grant is a light emission timeslot of the ONU. Each ONU has its own specific light emission timeslot. The ONU sends an optical signal to the OLT according to the light emission timeslot assigned by the OLT to the ONU. In a downlink direction (a direction from the OLT to an ONU), the OLT sends an optical signal to each ONU in a broadcast manner.

In a PON system, dynamic bandwidth assignment (DBA) is a mechanism in which dynamic assignment of uplink bandwidth to an ONU can be completed in a microsecond-level or millisecond-level time interval. A transmission container (T-CONT) is a basis for implementing the DBA in the PON system, and is a buffer unit for bearing a service. In practice, uplink data requires different DBA templates to be configured according to different requirements of a service, and the DBA templates to be bound to the T-CONT. Four types of bandwidth are defined in the PON, to implement five types of T-CONTs. After a specific T-CONT is defined, a defined service may be mapped to the required T-CONT. The different types of T-CONTs have different bandwidth assignment manners, and can meet different requirements of different service flows on a time delay, jitter, a packet loss rate, and the like.

Currently, the OLT receives, from each ONU in advance, a bandwidth request for an amount of data that is to be sent in the uplink direction, determines, in response to the request, uplink bandwidth that is to be assigned to a T-CONT of each ONU, and provides, to the ONU, a grant notification for sending allowable bandwidth. In the prior art, the OLT sets a maximum bandwidth value for the T-CONT of each ONU within a grant bandwidth period. Therefore, when grant traffic requested by the ONU exceeds the maximum bandwidth value that is set by the OLT, transmission of non-grant traffic is delayed, the non-grant traffic is transmitted in a subsequent DBA period, and the non-grant traffic is temporarily buffered in the ONU. Consequently, when the ONU has massive burst data traffic in the uplink direction, a response from the current DBA assignment mechanism has a time delay, and massive burst data packet losses occur due to an insufficient buffer of the ONU. For example, a bandwidth grant size assigned by an OLT to a single T-CONT of a single ONU in advance is 50 M. When the ONU requests the OLT for 100 M grant bandwidth for the T-CONT because uplink burst traffic of the ONU within a grant bandwidth period is 100 M, the OLT determines that a maximum bandwidth grant size that is currently set for the T-CONT of the ONU is 50 M, and the OLT assigns 50 M bandwidth to the ONU within the grant bandwidth period. In addition, remaining 50 M is temporarily stored in the ONU, and is transmitted within a next grant bandwidth period. As a result, the ONU requires at least two grant bandwidth periods to complete transmission of the 100 M data. In addition, if a buffer of the ONU is too small to temporarily store the 50 M burst traffic, the remaining burst traffic is discarded, and performance of an entire service is reduced.

SUMMARY

Embodiments of the present disclosure provide a dynamic bandwidth assignment method and apparatus, and a passive optical network system, to improve service performance and bandwidth utilization. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

According to a first aspect, a bandwidth assignment method is provided, where the method includes:

setting, by an optical line terminal, a maximum bandwidth grant size and a maximum burst bandwidth grant size for an optical network unit; receiving, by the optical line terminal, a bandwidth assignment request of the optical network unit; and when the optical line terminal determines, according to the bandwidth assignment request, that a bandwidth grant size requested to be assigned in the bandwidth assignment request is greater than the set maximum bandwidth grant size and less than or equal to the set maximum burst bandwidth grant size, delivering, by the optical line terminal in response to the request, the bandwidth grant size requested in the bandwidth assignment request of the optical network unit to the optical network unit.

The embodiments of the present disclosure provide a dynamic bandwidth assignment method, to improve service performance and bandwidth utilization. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

In addition, a bandwidth grant response message is delivered by using a bandwidth map (BWMap) message.

With reference to the first aspect, in a first possible implementation of the first aspect, the bandwidth grant size requested to be assigned in the bandwidth assignment request is a byte count requested to be assigned in the bandwidth assignment request, is a multiple of a bandwidth grant byte count assigned within a unit grant period, or is a time requested to be assigned in the bandwidth request.

With reference to the first aspect or the first possible implementation of the first aspect, in a second possible implementation of the first aspect, the maximum bandwidth grant size is a maximum bandwidth grant byte count, is a multiple of a bandwidth grant byte count assigned within a unit grant period, or is a maximum bandwidth grant time, where a value of a multiple corresponding to the bandwidth grant size requested to be assigned is different from a value of a multiple corresponding to the maximum bandwidth grant size.

With reference to the first aspect or the first possible implementation of the first aspect, in a third possible implementation of the first aspect or a second possible implementation of the first aspect, the maximum burst bandwidth grant size is a maximum burst bandwidth grant byte count, is a multiple of a bandwidth grant byte count assigned within a unit grant period, or is a maximum burst bandwidth grant time, where a value of a multiple corresponding to the maximum burst bandwidth grant size is different from a value of a multiple corresponding to the bandwidth grant size requested to be assigned and a value of a multiple corresponding to the maximum bandwidth grant size.

With reference to the first aspect or the first possible implementation of the first aspect, in a third possible implementation of the first aspect or a second possible implementation of the first aspect, the setting, by an optical line terminal, a maximum bandwidth grant size and a maximum burst bandwidth grant size for an optical network unit is specifically:

setting, by the optical line terminal, the maximum bandwidth grant size and the maximum burst bandwidth grant size for a transmission container T-CONT or a logical link identifier LLID of the optical network unit within a bandwidth grant period.

According to a second aspect, a bandwidth assignment apparatus is provided, including at least: a processor, a user interface module, and an optical module, where the processor is connected to the user interface module, and the user interface module is connected to the optical module, where the processor is configured to: set a maximum bandwidth grant size and a maximum burst bandwidth grant size for an optical network unit; read, by using the user interface module, a bandwidth assignment request reported by the optical module; and determine, according to the bandwidth assignment request, that a bandwidth grant size requested to be assigned in the bandwidth assignment request is greater than the set maximum bandwidth grant size and less than or equal to the set maximum burst bandwidth grant size, determine, in response to the request, to assign the requested bandwidth grant size to the optical network unit, send the determined bandwidth grant size to the user interface module, and instruct the user interface module to send the determined bandwidth grant size to the optical network unit; the user interface module is configured to: read the bandwidth assignment request reported by the optical module; and send, according to the instruction of the processor, the determined bandwidth grant size to the optical network unit by using the optical module; and the optical module is configured to: receive a bandwidth assignment request of the optical network unit, and report the request to the user interface module; and receive the determined bandwidth grant size sent by the user interface module, and forward the determined bandwidth grant size to the optical network unit.

The embodiments of the present disclosure provide a dynamic bandwidth assignment apparatus, to improve service performance and bandwidth utilization. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

In addition, a bandwidth grant response message is delivered by using a bandwidth map (BWMap) message.

With reference to the second aspect or a first possible implementation of the second aspect, in a second possible implementation of the second aspect, the bandwidth grant size requested to be assigned in the bandwidth request is a byte count requested to be assigned in the bandwidth request, is a multiple of a bandwidth grant byte count assigned within a unit grant period, or is a time requested to be assigned in the bandwidth request.

With reference to the second aspect or a first possible implementation of the second aspect, in a third possible implementation of the second aspect or a second possible implementation of the second aspect, the maximum bandwidth grant size is a maximum bandwidth grant byte count, is a multiple of a bandwidth grant byte count assigned within a unit grant period, or is a maximum bandwidth grant time, where a value of a multiple corresponding to the bandwidth grant size requested to be assigned is different from a value of a multiple corresponding to the maximum bandwidth grant size.

With reference to the second aspect or a first possible implementation of the second aspect, in a third possible implementation of the second aspect or a third possible implementation of the second aspect, the maximum burst bandwidth grant size is a maximum burst bandwidth grant byte count, is a multiple of a bandwidth grant byte count assigned within a unit grant period, or is a maximum burst bandwidth grant time, where a value of a multiple corresponding to the maximum burst bandwidth grant size is different from a value of a multiple corresponding to the bandwidth grant size requested to be assigned and a value of a multiple corresponding to the maximum bandwidth grant size.

According to a third aspect, a bandwidth assignment apparatus is provided, where the apparatus includes:

a setting unit, configured to set a maximum bandwidth grant size and a maximum burst bandwidth grant size for an optical network unit;

a transceiver unit, configured to receive a bandwidth assignment request of the optical network unit; and a processing unit, configured to: when determining, according to the bandwidth assignment request, that a bandwidth grant size requested to be assigned in the bandwidth request is greater than the set maximum bandwidth grant size and less than or equal to the set maximum burst bandwidth grant size, deliver, in response to the request, the bandwidth grant size requested in the assignment request of the optical network unit to the optical network unit by using the transceiver unit.

The bandwidth assignment apparatus of the optical network unit according to the third aspect may be an optical line terminal device in a passive optical network system, or be integrated in the optical line terminal device.

With reference to the third aspect, in a first possible implementation of the third aspect, the bandwidth grant size requested to be assigned in the bandwidth request is a byte count requested to be assigned in the bandwidth request, is a multiple of a bandwidth grant byte count assigned within a unit grant period, or is a time requested to be assigned in the bandwidth request.

With reference to the third aspect or the first possible implementation of the third aspect, in a second possible implementation of the third aspect, the maximum bandwidth grant size is a maximum bandwidth grant byte count, is a multiple of a bandwidth grant byte count assigned within a unit grant period, or is a maximum bandwidth grant time, where a value of a multiple corresponding to the bandwidth grant size requested to be assigned is different from a value of a multiple corresponding to the maximum bandwidth grant size.

With reference to the third aspect or the first possible implementation of the third aspect, in a third possible implementation of the third aspect, the maximum burst bandwidth grant size is a maximum burst bandwidth grant byte count, is a multiple of a bandwidth grant byte count assigned within a unit grant period, or is a maximum burst bandwidth grant time, where a value of a multiple corresponding to the maximum burst bandwidth grant size is different from a value of a multiple corresponding to the bandwidth grant size requested to be assigned and a value of a multiple corresponding to the maximum bandwidth grant size.

According to a fourth aspect, a bandwidth assignment apparatus is provided, where the apparatus is configured to perform the bandwidth assignment method recorded in any one of the possible implementations of the first aspect.

The bandwidth assignment apparatus of the optical network unit according to the fourth aspect may be an optical line terminal device in a passive optical network system, or be integrated in the optical line terminal device.

According to a fifth aspect, a passive optical network system is provided, where the optical network system includes: an optical line terminal, an optical distribution network, and at least one optical network unit, where the optical line terminal is connected to the optical network unit by using the optical distribution network, where the optical line terminal includes the bandwidth assignment apparatus according to any one of the possible implementations of the second aspect, the optical line terminal includes the bandwidth assignment apparatus according to any one of the possible implementations of the third aspect, or the optical line terminal includes the bandwidth assignment apparatus according to the fourth aspect.

In the embodiments of the present disclosure, the optical line terminal sets a maximum bandwidth grant size and a maximum burst bandwidth grant size for the optical network unit; receives a bandwidth assignment request of the optical network unit; and when the optical line terminal determines, according to the bandwidth assignment request, that a bandwidth grant size requested to be assigned in the bandwidth request is greater than the set maximum bandwidth grant size and less than or equal to the set maximum burst bandwidth grant size, the optical line terminal determines, in response to the request, to assign the requested bandwidth grant size to the optical network unit. Therefore, timely and accurate transmission of massive uplink burst data traffic is ensured, a transmission delay is reduced, service performance is improved, and system bandwidth utilization is greatly increased.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
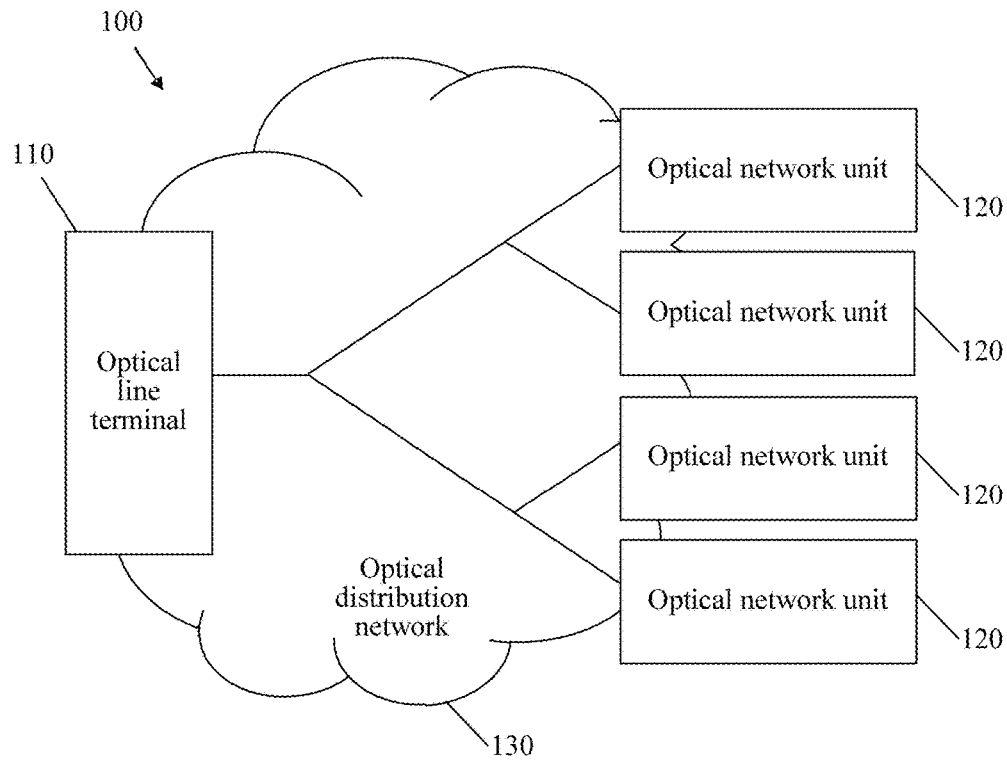
FIG. 1 is a schematic block diagram of an optical network system according to an embodiment of the present disclosure.

Referring to FIG. 1, FIG. 1 is a schematic block diagram of an optical network system according to an embodiment of the present disclosure. The passive optical network system 100 includes at least one OLT 110, a plurality of ONU 120, and one ODN 130. The optical line terminal 110 is connected to the plurality of optical network units 120 in a point-to-multipoint form by using the optical distribution network 130. The optical line terminal 110 and the optical network unit 120 may communicate with each other by using a TDM mechanism, a WDM mechanism, or a hybrid TDM/WDM mechanism. A direction from the optical line terminal 110 to the optical network unit 120 is defined as a downlink direction, and a direction from the optical network unit 120 to the optical line terminal 110 is an uplink direction.

The passive optical network system 100 may be a communications network that implements data distribution between the optical line terminal 110 and the optical network unit 120 without needing any active device. In a specific embodiment, the data distribution between the optical line terminal 110 and the optical network unit 120 may be implemented by using a passive optical device (such as an optical splitter) in the optical distribution network 130. The passive optical network system 100 may be an asynchronous transfer mode passive optical network (ATM PON) system or a broadband passive optical network (BPON) system defined by the ITU-T G.983 standard, a gigabit passive optical network (GPON) system defined by the ITU-T G.984 family of standards, an Ethernet passive optical network (EPON) system defined by the IEEE 802.3ah standard, a wavelength division multiplexing passive optical network (WDM PON) system, or a next generation passive optical network (NG PON) system such as an XGPON system defined by the ITU-T G.987 family of standards, a 10G EPON system defined by the IEEE 802.3av standard, or a hybrid TDM/WDM PON system. All content of various passive optical network systems defined in the foregoing standards is incorporated by reference in this application.

The optical line terminal 110 is usually located at a central location (for example, a central office (CO)), and can manage the plurality of optical network units 120 together. The optical line terminal 110 may serve as a medium between the optical network unit 120 and an upper-layer network (not shown), forward data received from the upper-layer network to the optical network unit 120 as downlink data, and forward uplink data received from the optical network unit 120 to the upper-layer network. A specific structural configuration of the optical line terminal 110 may vary according to a specific type of the passive optical network 100. In an embodiment, the optical line terminal 110 may include a control module, a switching module, and an interface module (not shown). The interface module may convert downlink data processed by the switching module into a downlink optical signal, send the downlink optical signal to the optical network unit 120 by using the optical distribution network 130, receive an uplink optical signal sent by the optical network unit 120 by using the optical distribution network 130, convert the uplink optical signal into a data signal such as an Ethernet data signal, and provide the data signal to the switching module to output the data signal to a network such as the Ethernet.

The optical network unit 120 may be disposed at a user side location (such as customer premises) in a distributed manner. The optical network unit 120 may be a network device configured to communicate with the optical line terminal 110 and a user. Specifically, the optical network unit 120 may serve as a medium between the optical line terminal 110 and the user. For example, the optical network unit 120 may forward downlink data received from the optical line terminal 110 to the user, and forward data received from the user to the optical line terminal 110 as uplink data. A specific structural configuration of the optical network unit 120 may vary according to the specific type of the passive optical network 100. In an embodiment, the optical network unit 120 may include an optical transceiver component 300. The optical transceiver component 300 is configured to: receive a downlink data signal sent by the optical line terminal 110 by using the optical distribution network 130, and send an uplink data signal to the optical line terminal 110 by using the optical distribution network 130. It should be understood that, in this application document, a structure of the optical network unit 120 is similar to that of an optical network terminal (Optical Network Terminal, ONT). Therefore, in the solutions provided in this application document, the optical network unit is interchangeable with the optical network terminal.

The optical distribution network 130 may be a data distribution system, and may include an optical fiber, an optical coupler, an optical multiplexer/demultiplexer, an optical splitter, and/or another device. In an embodiment, the optical fiber, the optical coupler, the optical multiplexer/demultiplexer, the optical splitter, and/or the another device may be a passive optical device. Specifically, the optical fiber, the optical coupler, the optical multiplexer/demultiplexer, the optical splitter, and/or the another device may be a device that distributes a data signal between the optical line terminal 110 and the optical network unit 120 and that does not require support of a power supply. In addition, in another embodiment, the optical distribution network 130 may further include one or more processing devices, for example, an optical amplifier or a relay device (Relay device). In a branch structure shown in FIG. 1, the optical distribution network 130 may specifically extend from the optical line terminal 110 to the plurality of optical network units 120, but may be alternatively configured as any other point-to-multipoint structure.

It should be understood that, in this embodiment of the present disclosure, the method and the apparatus for detecting an optical network unit according to this embodiment of the present disclosure may be applied to a PON system using TDM, for example, a GPON system, an Ethernet passive optical network (EPON) system, a 10G EPON system, or a 10G GPON system. For convenience of description, the following provides descriptions by using a GPON system as an example. However, the present disclosure is not limited thereto.

Figure 2:
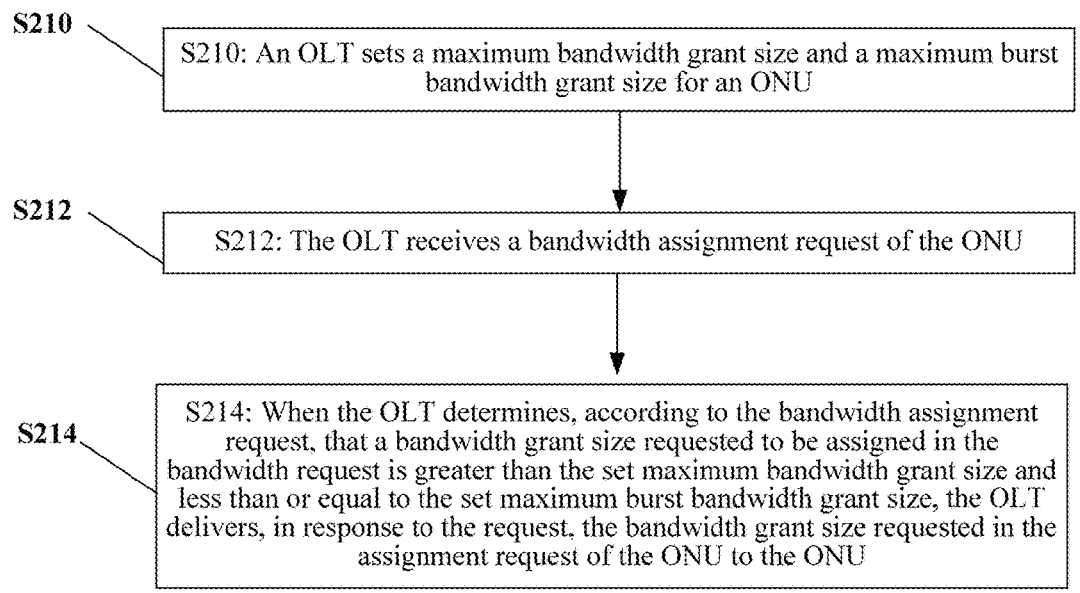
FIG. 2 is a schematic flowchart of a bandwidth assignment method according to an embodiment of the present disclosure.

FIG. 2 is a schematic flowchart of a bandwidth assignment method 200 according to an embodiment of the present disclosure. The method 200 may be performed by a bandwidth assignment apparatus. For example, the method 200 may be performed by an OLT. A location of the OLT in a PON system may be shown in FIG. 1.

As shown in FIG. 2, the method 200 includes the following steps.

S210: The OLT sets a maximum bandwidth grant size and a maximum burst bandwidth grant size for an ONU.

Specifically, the OLT sets a maximum bandwidth grant size and a maximum burst bandwidth grant size for a single T-CONT of a single ONU.

Optionally, the OLT may alternatively set a maximum burst bandwidth grant size for only the ONU.

The maximum burst bandwidth grant size is a maximum bandwidth grant size preset for a T-CONT of the ONU within a grant bandwidth period to ensure timely and accurate transmission of massive uplink burst data when the ONU needs to transmit the massive uplink burst data. For example, the maximum bandwidth grant size assigned to the ONU in advance is a maximum bandwidth grant size preset for the T-CONT of the ONU within the grant bandwidth period.

The maximum burst bandwidth grant size is a maximum burst bandwidth grant size preset by the ONU for the T-CONT of the ONU within the grant bandwidth period. A value range of the maximum bandwidth grant size is smaller than that of the maximum burst bandwidth grant size.

It should be noted that, the OLT sets the foregoing bandwidth thresholds for each ONU according to a service priority of the ONU, and limits service bandwidth. The OLT may set the maximum bandwidth grant size, may set the maximum burst bandwidth grant size, and may further set a minimum bandwidth grant size. These sizes limit bandwidth of each ONU, to ensure that bandwidth assignment varies as the service priority varies. Usually, a priority of a voice service is the highest, a priority of a video service is the second highest, and a priority of a data service is the lowest. Therefore, the OLT limits bandwidth of an ONU according to the service priority or the like, and a service with a higher priority can obtain higher bandwidth, thereby meeting a service requirement.

For the ONU, theses services with different priorities are mapped to a queue of different T-CONTs, and then the ONU schedules and outputs, according to a bandwidth assignment status of the OLT, data waiting to be sent in the queue.

Further optionally, a bandwidth grant size requested to be assigned in a bandwidth request is a byte count requested to be assigned in the bandwidth request, is a multiple of a bandwidth grant byte count assigned within a unit grant period, or is a time requested to be assigned in the bandwidth request.

The maximum bandwidth grant size is a maximum bandwidth grant byte count, is a multiple of a bandwidth grant byte count assigned within a unit grant period, or is a maximum bandwidth grant time, where a value of a multiple corresponding to the bandwidth grant size requested to be assigned is different from a value of a multiple corresponding to the maximum bandwidth grant size.

The maximum burst bandwidth grant size is a maximum burst bandwidth grant byte count, is a multiple of a bandwidth grant byte count assigned within a unit grant period, or is a maximum burst bandwidth grant time, where a value of a multiple corresponding to the maximum burst bandwidth grant size is different from a value of a multiple corresponding to the bandwidth grant size requested to be assigned and a value of a multiple corresponding to the maximum bandwidth grant size.

To sum up, the foregoing various bandwidth grant sizes may be represented in different forms. This is not specifically limited herein. The forms may include a maximum byte count within a grant bandwidth period, and the unit is byte B. For example, if a byte count delivered in one frame every 125 microseconds or every multiple of 125 microseconds is 1600 bytes, corresponding bandwidth after conversion is 100 Mbps, and 100 Mbps may be converted into 102400 kbps. In this way, a maximum byte count every 125 microseconds or every multiple of 125 microseconds may be set to 3200 bytes, that is, 200 Mbps. This configuration information may be configured on the OLT by using a command line:

"dba-profile add profile-id 21 type5 fix 128 assure 128 max 102400 max-burst size 3200", where profile indicates a DBA template, and profile-id 21 is a template of an identifier 21; type is a type of T-CONT, type5 is a type of a fifth T-CONT, and type5 is a comprehensive type of T-CONT, includes all bandwidth types, and may bear all services; the bandwidth types include: fixed bandwidth of a fixed bandwidth type, ensured bandwidth Assured bandwidth, and the like; and in a type5 type of T-CONT, 128 kbps of fixed bandwidth is assigned, 128 kbps of ensured bandwidth is assigned, a maximum bandwidth grant size is 102400 kbps, and a maximum burst bandwidth grant size is set to 3200 bytes. In addition, the maximum burst bandwidth grant size may be alternatively set to 200 Mbps. In the foregoing, unit granularities of various grant sizes are different, and bytes may be converted into kbps or Mbps according to an existing formula for communication. Both the maximum bandwidth grant size and the bandwidth grant size requested to be assigned in the bandwidth request may be values that are pointed out in the foregoing example and that are set to be in the unit of kbps, that are set to be in the unit of byte B, or that are set to be in the unit of Mbps, or that are set to be in unit of kbps. Among these values, as long as a value in one of the units is set, the value may be converted into a value in another unit.

A description is further provided by using an example in which the bandwidth grant size is a multiple of a bandwidth grant byte count assigned within a unit grant period. For example, if a byte count delivered in one frame every 125 microseconds or every multiple of 125 microseconds is 1600 bytes, corresponding bandwidth after conversion is 100 Mbps, and 100 Mbps may be converted into 102400 kbps. In this way, a maximum byte count every 125 microseconds or every multiple of 125 microseconds may be set to double the bandwidth grant byte count 1600 bytes within the unit grant period, that is, 3200 bytes. If the unit of Mbps is used, 3200 bytes is converted into 200 Mbps according to the formula. If the unit of kbps is used, 200 Mbps is further converted into 204800 kbps. This configuration information may be configured on the OLT by using a command line:

"dba-profile add profile-id 21 type5 fix 128 assure 128 max 102400 max-burst multiplier 2", where for descriptions of profile, profile-id, and type, refer to the specific description of the foregoing command line, and details are not described herein again. It should be noted the most that, the maximum bandwidth grant size may be set to the multiple of the bandwidth grant byte count assigned within the unit grant period. Herein, the bandwidth grant byte count assigned within the unit grant period may be in a unit of the byte count 1600 delivered in one frame every 125 microseconds or every multiple of 125 microseconds. The maximum bandwidth grant size is double 1600 bytes, that is, 3200 bytes corresponding to 200 Mbps or 20480000 kbps.

All assigned bandwidth grant sizes may be values that are pointed out in the foregoing example and that are set to be in the unit of kbps, that are set to be in the unit of byte B, or that are set to be in the unit of Mbps, or that are set to be in unit of kbps. Among these values, as long as a value in one of the units is set, the value may be converted into a value in another unit. The bandwidth grant sizes include the bandwidth grant size requested to be assigned in the bandwidth request, the maximum bandwidth grant size, and the maximum burst bandwidth grant size that are mentioned above. It should be noted that, a multiple corresponding to the maximum bandwidth grant size is different from a multiple corresponding to the maximum burst bandwidth grant size. For example, the multiple corresponding to the maximum bandwidth grant size is one time, that is, 1600 bytes, and then the multiple corresponding to the maximum burst bandwidth grant size may be double, that is, the maximum burst bandwidth grant size is set to 3200 bytes, to apply to a case in which the ONU has massive burst data packets that need to be sent. In this case, the massive uplink data packets of the ONU may be accurately sent in time according to the maximum burst bandwidth grant size without a time delay and with the support of the maximum burst bandwidth grant size.

A description is further provided by using an example in which the bandwidth grant size is a bandwidth grant time. For example, if a byte count delivered in one frame every 125 microseconds or every multiple of 125 microseconds is 1600 bytes, corresponding bandwidth is 100 Mbps, the bandwidth grant size may be set to 3200 bytes, and corresponding bandwidth is 200 Mbps, a corresponding grant time is 250 microseconds, and then the bandwidth grant size may be set to 250 microseconds. This configuration information may be configured on the OLT by using a command line:

"dba-profile add profile-id 21 type5 fix 128 assure 128 max 102400 max-burst time 250", where for descriptions of profile, profile-id, and type, refer to the specific description of the foregoing command line, and details are not described herein again. It should be noted the most that, the bandwidth grant size herein may include: the maximum burst bandwidth grant size, the maximum bandwidth grant size, or the bandwidth grant size requested to be assigned in the bandwidth request. All these bandwidth grant sizes may be set by using the foregoing command line, and the unit of a grant size that is set may be a time, a byte count, a multiple of bytes within a unit grant bandwidth, or the like.

The unit of a specific bandwidth grant is not limited herein, and may be described by using the various methods recorded in the foregoing, such as the byte count, the time, and the multiple. Alternatively, various different bandwidth grant sizes may be randomly combined according to the foregoing different units. For example, the bandwidth grant size requested to be assigned in the bandwidth request may be set to 3200 bytes, the maximum bandwidth grant size may be set to 125 microseconds, and the maximum burst bandwidth grant size may be set to double a unit grant size. In addition, these units are mutually convertible, for example, the bandwidth grant size may be learned through conversion according to one byte being eight bits. In addition, it should be noted that, the solution described in this embodiment applies to five types supported by a T-CONT. A T-CONT of a type1 type is of a fixed bandwidth type, and is mainly for a service sensitive to a time delay and a service with a high priority, such as a voice service. T-CONTs of type2 and type3 types are of ensured bandwidth types, and are mainly for a video service and a data service with a high priority. Type4 is a best effort type, and is mainly for data services with relatively low priorities, such as the Internet and an email, and the services of this type do not have a high requirement on bandwidth. Type5 is a comprehensive T-CONT type, includes all bandwidth types, and may bear all services. When the foregoing bandwidth assignment method is applied to T-CONTs of the three types, that is, type3, type4, and type5, bandwidth utilization effects are better.

The maximum bandwidth grant size and the maximum burst bandwidth grant size that are preset by the OLT can both enable the ONU to quickly and accurately transmit massive burst data in time when there is enough bandwidth.

S212: The OLT receives a bandwidth assignment request of the ONU.

Specifically, the ONU sends the bandwidth assignment request message to the OLT, and the OLT receives the bandwidth assignment request of the ONU.

The bandwidth assignment request message sent by the ONU may be an optical network terminal management and control interface (OMCI) message, an operation, administration and maintenance (OAM) message, or the like.

S214: When the OLT determines, according to the bandwidth assignment request, that a bandwidth grant size requested to be assigned in the bandwidth request is greater than the set maximum bandwidth grant size and less than or equal to the set maximum burst bandwidth grant size, the OLT delivers, in response to the request, the bandwidth grant size requested in the assignment request of the ONU to the ONU.

When the ONU is to transmit massive burst uplink data within the bandwidth grant period, the ONU requests high bandwidth from the OLT, to satisfy the transmission of the massive burst data. In this case, after receiving the bandwidth assignment request of the ONU, the OLT performs related calculation: determining that the bandwidth grant size requested to be assigned in the bandwidth request is greater than the set maximum bandwidth grant size and is less than or equal to the set maximum burst bandwidth grant size, and the optical line terminal delivers, in response to the request, the bandwidth grant size requested in the assignment request of the optical network unit to the optical network unit. For example, the maximum bandwidth grant size preset by the OLT for the ONU is 100 M, and the set maximum burst bandwidth grant size is 200 M. The ONU may obtain massive uplink burst data because a user requests a service requirement such as a video. Assuming that 200 M needs to be transmitted, the ONU sends a bandwidth assignment request, to request the OLT to assign 200 M bandwidth to transmit massive uplink burst data. After receiving the request, the OLT learns that the ONU requests 200 M bandwidth. However, the maximum bandwidth grant size within the bandwidth period is set to 100 M. Obviously, if data is transmitted according to 100 M bandwidth, the transmission needs to be performed twice. In addition, the ONU needs to temporarily store, in a buffer of the ONU, remaining 100 M data that is not transmitted in the first transmission, and some to-be-transmitted data is discarded because buffer space of the ONU is less than 100 M.

In this case, the OLT further determines whether the requested bandwidth grant size 200 M is less than or equal to the set maximum burst bandwidth grant size. Because the set maximum burst bandwidth grant size is 200 M, the assignment request of the ONU is satisfied, and 200 M bandwidth is granted to the ONU to transmit 200 M data.

It should be noted that, the OLT delivers, in a downlink frame, a calculation result to each ONU in a form of BWMap. Each ONU sends, in a specified timeslot, to-be-sent data in a current T-CONT according to BWMap information, occupies uplink bandwidth, and enables a burst data packet of the ONU to be transmitted in time, thereby avoiding a case in which a packet is lost due to an insufficient buffer of the ONU and then transmission of the service is affected, so as to increase reliability and timeliness of massive data transmission, and increase an experience degree of the user. The ONU sends, in a specified timeslot, a to-be-sent data status report in the current T-CONT according to bandwidth assignment information. It should be further noted that, in the entire bandwidth assignment process, the OLT needs to learn, in whichever process, remaining bandwidth of the entire system before assignment, and whichever process needs to be completed under a precondition that the OLT has enough bandwidth to support bandwidth assigned to the ONU.

This embodiment of the present disclosure provides a bandwidth assignment method. A maximum bandwidth grant size and a maximum burst bandwidth grant size are set for an optical network unit; the optical line terminal receives a bandwidth assignment request of the optical network unit; and when the optical line terminal determines, according to the bandwidth assignment request, that a bandwidth grant size requested to be assigned in the bandwidth request is greater than the set maximum bandwidth grant size and less than or equal to the set maximum burst bandwidth grant size, the optical line terminal delivers, in response to the request, the bandwidth grant size requested in the assignment request of the optical network unit to the optical network unit. Therefore, service performance and bandwidth utilization can be improved. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

The foregoing describes, in detail, the bandwidth assignment method according to an embodiment of the present disclosure with reference to FIG. 2. The following describes, in detail, bandwidth assignment apparatuses according to embodiments of the present disclosure with reference to FIG. 3, FIG. 4. The bandwidth assignment apparatuses may be configured to perform the bandwidth assignment method that is described in FIG. 2 and the corresponding embodiment. The following further describes bandwidth assignment of the apparatuses with reference to structures of the apparatuses in detail.

Figure 3:
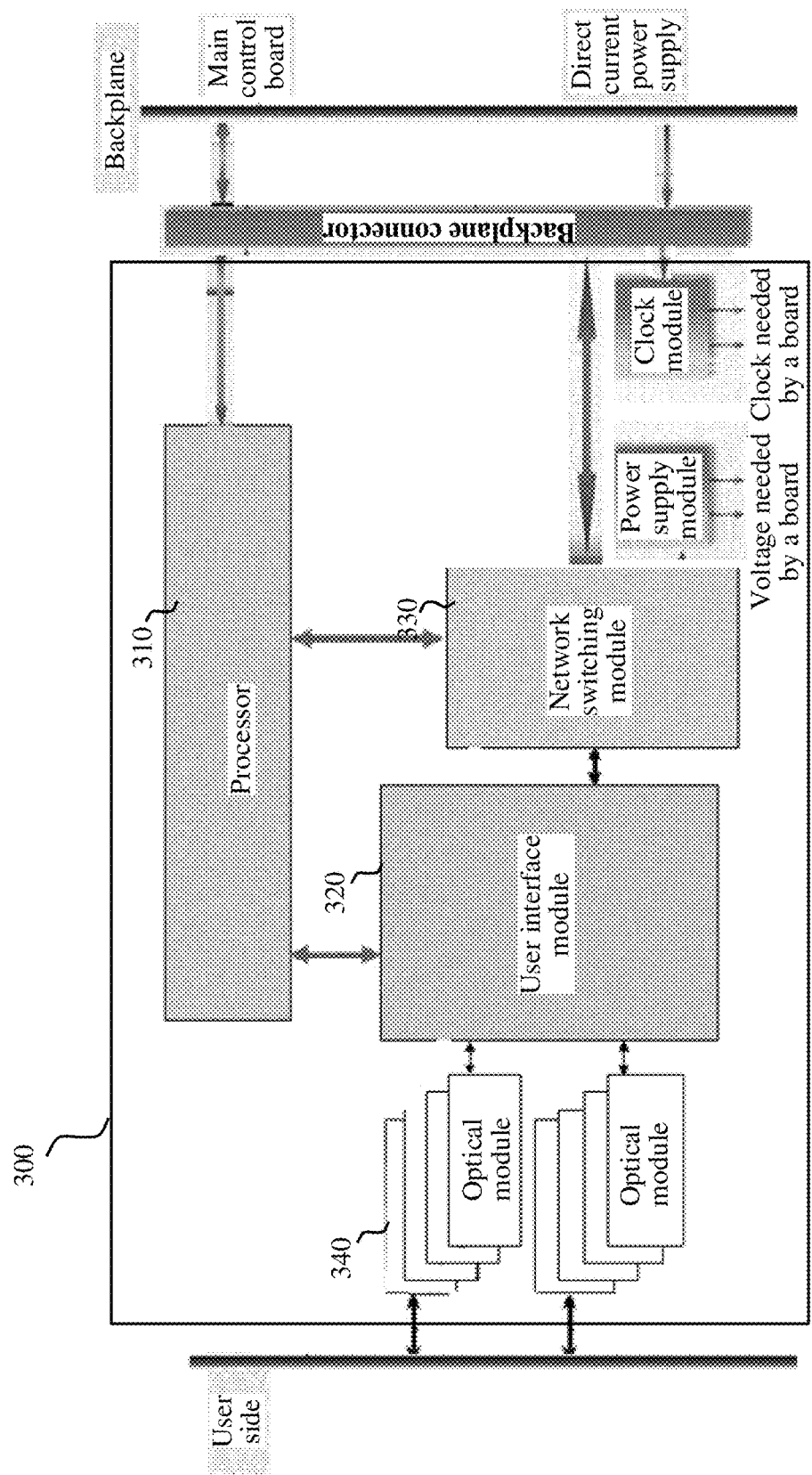
FIG. 3 is a schematic block diagram of an bandwidth assignment apparatus according to an embodiment of the present disclosure.

FIG. 3 is a schematic block diagram of an bandwidth assignment apparatus 300 according to an embodiment of the present disclosure. The apparatus 300 include at least: a processor 310, a user interface module 320, and an optical module 340.

The processor 310 is connected to the user interface module 320, and the user interface module 320 is connected to the optical module 340.

The processor 310 is configured to: set a maximum bandwidth grant size and a maximum burst bandwidth grant size for the optical network unit; read, by using the user interface module, a bandwidth assignment request reported by the optical module; and determine, according to the bandwidth assignment request, that a bandwidth grant size requested to be assigned in the bandwidth request is greater than the set maximum bandwidth grant size and less than or equal to the set maximum burst bandwidth grant size, determine, in response to the request, to assign the requested bandwidth grant size to the optical network unit, send the determined bandwidth grant size to the user interface module, and instruct the user interface module to send the determined bandwidth grant size to the optical network unit.

The user interface module 320 is configured to: read the bandwidth assignment request reported by the optical module; and send, according to the instruction of the processor, the determined bandwidth grant size to the optical network unit by using the optical module.

The optical module 340 is configured to: receive a bandwidth assignment request of the optical network unit, and report the request to the user interface module; and receive the determined bandwidth grant size sent by the user interface module, and forward the determined bandwidth grant size to the optical network unit.

As shown in FIG. 3, a plurality of apparatuses 300 for detecting an ONU may be integrated into a backplane by using a backplane connector, and controlled by a main control board. The devices for detecting an ONU may be integrated into an OLT, or may be OLT devices. A plurality of OLT devices may be integrated as boards by using the backplane connector, and connected to the main control board of the backplane.

Corresponding to the architectural diagram of the PON system in FIG. 1, it can be seen from FIG. 3 that, one end of the apparatus 300 for detecting an ONU is connected to a user side device, such as the ONU, and the other end is connected to a network device by using the backplane, such as each type of server. The device for detecting an ONU may be integrated into the OLT device in FIG. 1.

The apparatus 300 for detecting an ONU may further include a network switching module 330. The processor 310 is separately connected to the user interface module 320 and the network switching module 330, and the other end is connected to the main control board of the backplane by using the backplane connector. The processor 310 may be configured to receive an instruction of the main control board on the backplane, and separately communicate with the user interface module 320 and the network switching module 330. One end of the user interface module 320 is connected to the optical module, and the other end is connected to the network switching module 330, to forward data received by the network switching module to the user side device by using the optical module 340, or forward data of the user side device to the network switching module 330 by using the optical module 340, for processing. One end of the network switching module 330 is connected to the user interface module 320, and the other end is connected to the main control board on the backplane by using the backplane connector, to receive network side data, such as data from the Ethernet, convert the network side data into an optical signal, and send the optical signal to the user interface module 320, and the user interface module 320 sends the optical signal to the user side device; or receive user side data received by the user interface module 320, and convert the data into a format of a network side data that needs to be sent, for example, receive an optical signal from the user interface module, convert the optical signal into an Ethernet frame, and send the Ethernet frame to the Ethernet.

Optionally, the apparatus 300 for detecting an ONT may further include: a power supply module, configured to support a voltage needed by a board; and a clock module, configured to support a clock needed by the board.

It should be noted that, the apparatus may be integrated into a central office device such as the OLT, or may perform assignment by using modules of the existing OLT device, for example, FIG. 300. The apparatus 300 may be a single board, and connected to the backplane by using the backplane connector. The apparatus 300 may further include the backplane connector, the backplane, and the main control board and a direct current power supply that are on the backplane. The direct current power supply is configured to supply power to the detection device.

It should be understood that in this embodiment of the present disclosure, the processor may be a central processing unit (CPU), or the processor may further be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor, or the like.

The user interface module may be a Media Access Control (MAC) chip or a MAC module.

In an implementation process, in the processor mentioned in the following, a logic circuit or an instruction in a software form may be integrated into hardware to complete a processing function.

Further, the processor is specifically configured to set the maximum bandwidth grant size and the maximum burst bandwidth grant size for a transmission container T-CONT or a logical link identifier LLID of the optical network unit within a bandwidth grant period.

Further, a bandwidth grant size requested to be assigned in the bandwidth request is a byte count requested to be assigned in the bandwidth request, is a multiple of a bandwidth grant byte count assigned within a unit grant period, or is a time requested to be assigned in the bandwidth request.

The maximum bandwidth grant size is a maximum bandwidth grant byte count, is a multiple of a bandwidth grant byte count assigned within a unit grant period, or is a maximum bandwidth grant time, where a value of a multiple corresponding to the bandwidth grant size requested to be assigned is different from a value of a multiple corresponding to the maximum bandwidth grant size.

The maximum burst bandwidth grant size is a maximum burst bandwidth grant byte count, is a multiple of a bandwidth grant byte count assigned within a unit grant period, or is a maximum burst bandwidth grant time, where a value of a multiple corresponding to the maximum burst bandwidth grant size is different from a value of a multiple corresponding to the bandwidth grant size requested to be assigned and a value of a multiple corresponding to the maximum bandwidth grant size.

Optionally, the bandwidth assignment apparatus 300 may further include: a processor 310, a user interface module 320, and the optical module 340. The processor 310 is configured to set a maximum bandwidth grant size and a maximum burst bandwidth grant size. The user interface module 320 is configured to: read the set maximum bandwidth grant size and maximum burst bandwidth grant size according to an instruction of the processor; receive a bandwidth assignment request of the optical network unit; and when determining, according to the bandwidth assignment request, that a bandwidth grant size requested to be assigned in the bandwidth request is greater than the set maximum bandwidth grant size and less than or equal to the set maximum burst bandwidth grant size, deliver, in response to the request, the bandwidth grant size requested in the assignment request of the ONU to the ONU by using the optical module. The optical module 340 is configured to: receive the bandwidth assignment request of the optical network unit, and report the request to the user interface module; and receive the determined bandwidth grant size sent by the user interface module, and forward the determined bandwidth grant size to the ONU.

Optionally, the bandwidth assignment apparatus may further include: a user interface module 320 and an optical module 340. The user interface module 320 is specifically configured to: set a maximum bandwidth grant size and a maximum burst bandwidth grant size; receive a bandwidth assignment request of the optical network unit; and when determining, according to the bandwidth assignment request, that a bandwidth grant size requested to be assigned in the bandwidth request is greater than the set maximum bandwidth grant size and less than or equal to the set maximum burst bandwidth grant size, deliver, in response to the request, the bandwidth grant size requested in the assignment request of the ONU to the ONU by using the optical module. The optical module 340 is configured to: receive the bandwidth assignment request of the optical network unit, and report the request to the user interface module; and receive the determined bandwidth grant size sent by the user interface module, and forward the determined bandwidth grant size to the ONU.

A specific bandwidth assignment process is already described in detail in the foregoing embodiment of the bandwidth assignment method. For details, refer to the description in the method embodiment. Details are not described herein again.

This embodiment of the present disclosure provides a bandwidth assignment apparatus. The processor in the apparatus is configured to: set a maximum bandwidth grant size and a maximum burst bandwidth grant size for the optical network unit; read, by using the user interface module, a bandwidth assignment request reported by the optical module; determine, according to the bandwidth assignment request, that a bandwidth grant size requested to be assigned in the bandwidth request is greater than the set maximum bandwidth grant size and less than or equal to the set maximum burst bandwidth grant size, determine, in response to the request, to assign the requested bandwidth grant size to the optical network unit, send the determined bandwidth grant size to the user interface module, and instruct the user interface module to send the determined bandwidth grant size to the optical network unit. The user interface module is configured to read the bandwidth assignment request reported by the optical module; and send, according to an instruction of the processor, the determined bandwidth grant size to the optical network unit by using the optical module. The optical module is configured to: receive a bandwidth assignment request of the optical network unit, and report the request to the user interface module; receive the determined bandwidth grant size sent by the user interface module, and forward the determined bandwidth grant size to the optical network unit. Therefore, service performance and bandwidth utilization can be improved. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

An embodiment of the present disclosure further provides another apparatus 400 for detecting an optical network unit. The apparatus 400 includes:

a setting unit 402, configured to set a maximum bandwidth grant size and a maximum burst bandwidth grant size for an optical network unit;

a transceiver unit 404, configured to receive a bandwidth assignment request of the optical network unit; and a processing unit 406, configured to: when determining, according to the bandwidth assignment request, that a bandwidth grant size requested to be assigned in the bandwidth request is greater than the set maximum bandwidth grant size and less than or equal to the set maximum burst bandwidth grant size, deliver, in response to the request, the bandwidth grant size requested in the assignment request of the optical network unit to the optical network unit by using the transceiver unit 404.

Further, a bandwidth grant size requested to be assigned in the bandwidth request is a byte count requested to be assigned in the bandwidth request, is a multiple of a bandwidth grant byte count assigned within a unit grant period, or is a time requested to be assigned in the bandwidth request.

Further, the maximum bandwidth grant size is a maximum bandwidth grant byte count, is a multiple of a bandwidth grant byte count assigned within a unit grant period, or is a maximum bandwidth grant time, where a value of a multiple corresponding to the bandwidth grant size requested to be assigned is different from a value of a multiple corresponding to the maximum bandwidth grant size.

Further, the maximum burst bandwidth grant size is a maximum burst bandwidth grant byte count, is a multiple of a bandwidth grant byte count assigned within a unit grant period, or is a maximum burst bandwidth grant time, where a value of a multiple corresponding to the maximum burst bandwidth grant size is different from a value of a multiple corresponding to the bandwidth grant size requested to be assigned and a value of a multiple corresponding to the maximum bandwidth grant size.

This embodiment of the present disclosure provides a bandwidth assignment apparatus. The setting unit in the apparatus is configured to set a maximum bandwidth grant size and a maximum burst bandwidth grant size for the optical network unit. When determining, according to the bandwidth assignment request, that a bandwidth grant size requested to be assigned in the bandwidth request is greater than the set maximum bandwidth grant size and less than or equal to the set maximum burst bandwidth grant size, the processor delivers, in response to the request, the bandwidth grant size requested in the assignment request of the optical network unit to the optical network unit by using the transceiver unit. Therefore, service performance and bandwidth utilization can be improved. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

An embodiment of the present disclosure further provides a bandwidth assignment apparatus, such as an optical line terminal, to perform a bandwidth assignment method described in FIG. 2 and the embodiment corresponding to FIG. 2. For details, refer to the description about FIG. 2 and the specific embodiment corresponding to FIG. 2. Details are not described herein again.

An embodiment of the present disclosure further provides a passive optical network system. As shown in FIG. 1, the optical network system includes: an optical line terminal, an optical distribution network, and at least one optical network unit. The optical line terminal is connected to the optical network unit by using the optical distribution network. The optical line terminal is configured to: set a maximum bandwidth grant size and a maximum burst bandwidth grant size for the optical network unit; receive a bandwidth assignment request of the optical network unit; and when determining, according to the bandwidth assignment request, that a bandwidth grant size requested to be assigned in the bandwidth request is greater than the set maximum bandwidth grant size and less than or equal to the set maximum burst bandwidth grant size, deliver, in response to the request, the bandwidth grant size requested in the assignment request of the optical network unit to the optical network unit.

Specifically, the optical line terminal may include the apparatus 300 that is for detecting an optical network unit and that is shown in FIG. 3. For a structural hardware diagram of the apparatus 300 and a function performed by each hardware module, refer to the description in the corresponding embodiment. Details are not described herein again.

Figure 4:
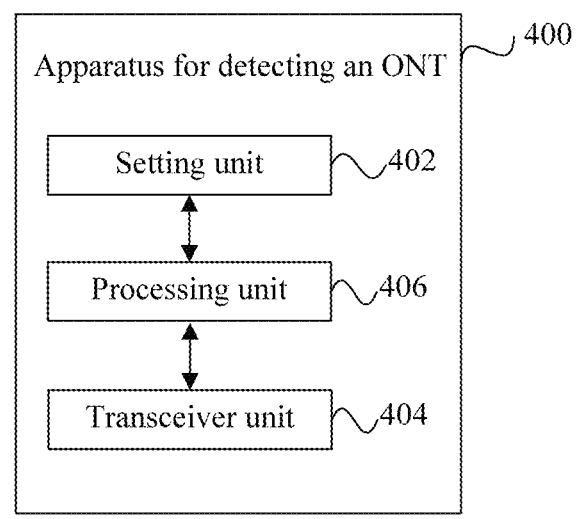
FIG. 4 is another schematic block diagram of an bandwidth assignment apparatus according to an embodiment of the present disclosure.

Specifically, the optical line terminal may further include the apparatus 400 that is for detecting an optical network unit and that is shown in FIG. 4. For a structural hardware diagram of the apparatus 400 and a function performed by each hardware module, refer to the description in the corresponding embodiment. Details are not described herein again.

This embodiment of the present disclosure provides a passive optical network system. A maximum bandwidth grant size and a maximum burst bandwidth grant size are set for the optical network unit; the optical line terminal receives a bandwidth assignment request of the optical network unit; and when the optical line terminal determines, according to the bandwidth assignment request, that a bandwidth grant size requested to be assigned in the bandwidth request is greater than the set maximum bandwidth grant size and less than or equal to the set maximum burst bandwidth grant size, the optical line terminal delivers, in response to the request, the bandwidth grant size requested in the assignment request of the optical network unit to the optical network unit. Therefore, service performance and bandwidth utilization can be improved. In particular, when massive uplink burst data traffic is to be transmitted, timely and accurate transmission of the massive uplink burst data traffic is ensured by using a preset maximum burst bandwidth grant size, a transmission delay is reduced, and system bandwidth utilization is greatly increased.

It should be further understood that, in this embodiment of the present disclosure, the bandwidth assignment apparatus according to this embodiment of the present disclosure may correspond to an execution body of the method according to an embodiment of the present disclosure, and may further correspond to the apparatuses that are for detecting an optical network terminal and that are mentioned in the foregoing embodiments. In addition, the foregoing and other operations and/or functions of the modules in the apparatus are separately for implementing the corresponding processes of the method in FIG. 2. For brevity, Details are not described herein again.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A bandwidth assignment method, the method comprising:
    setting, by an optical line terminal, a maximum bandwidth grant size and a maximum burst bandwidth grant size for an optical network unit;
    receiving, by the optical line terminal, a bandwidth assignment request of the optical network unit; and
    when the optical line terminal determines, according to the bandwidth assignment request, that a bandwidth grant size requested to be assigned in the bandwidth assignment request is greater than the set maximum bandwidth grant size and less than or equal to the set maximum burst bandwidth grant size, delivering, by the optical line terminal in response to the request, the bandwidth grant size requested in the bandwidth assignment request of the optical network unit to the optical network unit.

2. The method according to claim 1, wherein the bandwidth grant size requested to be assigned in the bandwidth assignment request comprises:
    a byte count requested to be assigned in the bandwidth request; or
    a multiple of a bandwidth grant byte count assigned within a unit grant period; or
    a time requested to be assigned in the bandwidth assignment request.

3. The method according to claim 1, wherein the maximum bandwidth grant size comprises:
    a maximum bandwidth grant byte count; or
    a multiple of a bandwidth grant byte count assigned within a unit grant period; or
    a maximum bandwidth grant time;
    wherein a value of a multiple corresponding to the bandwidth grant size requested to be assigned is different from a value of a multiple corresponding to the maximum bandwidth grant size.

4. The method according to claim 1, wherein the maximum burst bandwidth grant size comprises:
    a maximum burst bandwidth grant byte count; or
    a multiple of a bandwidth grant byte count assigned within a unit grant period; or
    a maximum burst bandwidth grant time;
    wherein a value of a multiple corresponding to the maximum burst bandwidth grant size is different from a value of a multiple corresponding to the bandwidth grant size requested to be assigned and a value of a multiple corresponding to the maximum bandwidth grant size.

5. The method according to claim 1, wherein setting, by the optical line terminal, the maximum bandwidth grant size and the maximum burst bandwidth grant size for the optical network unit comprises:
    setting, by the optical line terminal, the maximum bandwidth grant size and the maximum burst bandwidth grant size for a transmission container (T-CONT) or a logical link identifier (LLID) of the optical network unit within a bandwidth grant period.

6. A bandwidth assignment apparatus, comprising: a processor, a user interface module, and an optical module, wherein the processor is connected to the user interface module, and the user interface module is connected to the optical module, wherein:
    the processor is configured to:
        set a maximum bandwidth grant size and a maximum burst bandwidth grant size for an optical network unit,
        read, by using the user interface module, a bandwidth assignment request reported by the optical module, and
        determine, according to the bandwidth assignment request, that a bandwidth grant size requested to be assigned in the bandwidth assignment request is greater than the set maximum bandwidth grant size and less than or equal to the set maximum burst bandwidth grant size,
        determine, in response to the request, the requested bandwidth grant size to be assigned to the optical network unit,
        send the determined bandwidth grant size to the user interface module, and
        instruct the user interface module to send the determined bandwidth grant size to the optical network unit;
    the user interface module is configured to:
        read the bandwidth assignment request reported by the optical module, and
        send, according to the processor, the determined bandwidth grant size to the optical network unit by using the optical module; and
    the optical module is configured to:
        receive a bandwidth assignment request of the optical network unit, and report the request to the user interface module, and
        receive the determined bandwidth grant size sent by the user interface module, and forward the determined bandwidth grant size to the optical network unit.

7. The apparatus according to claim 6, wherein the bandwidth grant size requested to be assigned in the bandwidth request comprises:
    a byte count requested to be assigned in the bandwidth assignment request; or,
    a multiple of a bandwidth grant byte count assigned within a unit grant period; or
    a time requested to be assigned in the bandwidth assignment request.

8. The apparatus according to claim 6, wherein the maximum bandwidth grant size comprises:
    a maximum bandwidth grant byte count; or
    a multiple of a bandwidth grant byte count assigned within a unit grant period; or a maximum bandwidth grant time;
wherein a value of a multiple corresponding to the bandwidth grant size requested to be assigned is different from a value of a multiple corresponding to the maximum bandwidth grant size.

9. The apparatus according to claim 6, wherein the maximum burst bandwidth grant size comprises:
a maximum burst bandwidth grant byte count; or
a multiple of a bandwidth grant byte count assigned within a unit grant period; or
a maximum burst bandwidth grant time;
wherein a value of a multiple corresponding to the maximum burst bandwidth grant size is different from a value of a multiple corresponding to the bandwidth grant size requested to be assigned and a value of a multiple corresponding to the maximum bandwidth grant size.

10. The apparatus according to claim 6, wherein the processor is configured to set the maximum bandwidth grant size and the maximum burst bandwidth grant size for a transmission container (T-CONT) or a logical link identifier (LLID) of the optical network unit within a bandwidth grant period.

11. A passive optical network system, comprising:
an optical line terminal;
an optical distribution network;
at least one optical network unit;
wherein the optical line terminal is connected to the optical network unit by using the optical distribution network, wherein the optical line terminal comprises:
a processor, a user interface module, and an optical module, wherein the processor is connected to the user interface module, and the user interface module is connected to the optical module, wherein:
the processor is configured to:
set a maximum bandwidth grant size and a maximum burst bandwidth grant size for an optical network unit,
read, by using the user interface module, a bandwidth assignment request reported by the optical module, and
determine, according to the bandwidth assignment request, that a bandwidth grant size requested to be assigned in the bandwidth assignment request is greater than the set maximum bandwidth grant size and less than or equal to the set maximum burst bandwidth grant size,
determine, in response to the request, the requested bandwidth grant size to be assigned to the optical network unit,
send the determined bandwidth grant size to the user interface module, and
instruct the user interface module to send the determined bandwidth grant size to the optical network unit;
the user interface module is configured to:
read the bandwidth assignment request reported by the optical module, and
send, according to the processor, the determined bandwidth grant size to the optical network unit by using the optical module; and
the optical module is configured to:
receive a bandwidth assignment request of the optical network unit, and report the request to the user interface module, and
receive the determined bandwidth grant size sent by the user interface module, and forward the determined bandwidth grant size to the optical network unit.

12. The system according to claim 11, wherein the bandwidth grant size requested to be assigned in the bandwidth request comprises:
a byte count requested to be assigned in the bandwidth assignment request; or
a multiple of a bandwidth grant byte count assigned within a unit grant period; or
a time requested to be assigned in the bandwidth assignment request.

13. The system according to claim 11, wherein the maximum bandwidth grant size comprises:
a maximum bandwidth grant byte count; or
a multiple of a bandwidth grant byte count assigned within a unit grant period; or
a maximum bandwidth grant time;
wherein a value of a multiple corresponding to the bandwidth grant size requested to be assigned is different from a value of a multiple corresponding to the maximum bandwidth grant size.

14. The system according to claim 11, wherein the maximum burst bandwidth grant size comprises:
a maximum burst bandwidth grant byte count; or
a multiple of a bandwidth grant byte count assigned within a unit grant period; or
a maximum burst bandwidth grant time;
wherein a value of a multiple corresponding to the maximum burst bandwidth grant size is different from a value of a multiple corresponding to the bandwidth grant size requested to be assigned and a value of a multiple corresponding to the maximum bandwidth grant size.

15. The system according to claim 11, wherein the processor is configured to set the maximum bandwidth grant size and the maximum burst bandwidth grant size for a transmission container (T-CONT) or a logical link identifier (LLID) of the optical network unit within a bandwidth grant period.

* * * * *